United States Patent
Hou et al.

(10) Patent No.: US 8,810,721 B2
(45) Date of Patent: Aug. 19, 2014

(54) CAMERA MODULE

(75) Inventors: Chi-Kuen Hou, Tainan (TW); Ching-Hung Ko, Tainan (TW)

(73) Assignee: Himax Technologies Limited, Tainan (TW)

( * ) Notice: Subject to any disclaimer, the term of this patent is extended or adjusted under 35 U.S.C. 154(b) by 262 days.

(21) Appl. No.: 13/224,512

(22) Filed: Sep. 2, 2011

(65) Prior Publication Data
US 2013/0057755 A1 Mar. 7, 2013

(51) Int. Cl.
*H04N 5/225* (2006.01)

(52) U.S. Cl.
CPC .................................. *H04N 5/2257* (2013.01)
USPC .......................................... 348/374; 348/340

(58) Field of Classification Search
CPC . H04N 5/2254; H04N 5/2253; H04N 5/2257; H01L 27/14627; H01L 27/14625
USPC .................................................. 348/374, 340
See application file for complete search history.

(56) References Cited

U.S. PATENT DOCUMENTS

| | | | |
|---|---|---|---|
| 2004/0017501 A1* | 1/2004 | Asaga et al. | 348/340 |
| 2006/0062559 A1* | 3/2006 | Naka et al. | 396/79 |
| 2006/0132644 A1* | 6/2006 | Shangguan et al. | 348/374 |
| 2010/0123817 A1 | 5/2010 | Liao et al. | |
| 2010/0322610 A1 | 12/2010 | Lusinchi | |

FOREIGN PATENT DOCUMENTS

| | | |
|---|---|---|
| TW | 201020603 A | 6/2010 |
| TW | 201111852 A | 4/2011 |
| TW | 201118451 A | 6/2011 |

OTHER PUBLICATIONS

English translation of abstract of TW 201020603 A (published Jun. 1, 2010).
English translation of abstract of TW 201118451 A (published Jun. 1, 2011).
English translation of abstract of TW 201111852 A (published Apr. 1, 2011).

* cited by examiner

*Primary Examiner* — Twyler Haskins
*Assistant Examiner* — Quang Le
(74) *Attorney, Agent, or Firm* — McClure, Qualey & Rodack, LLP

(57) ABSTRACT

A camera module includes a lens module, an image sensor, at least one first spacer, and a bump element. The lens module includes a lens unit and a supporting unit connected to the lens unit. The image sensor is disposed corresponding in position to the lens unit for sensing light from the lens unit. The first spacer is disposed between the supporting unit of the lens module and the image sensor for separating the lens module and the image sensor. The bump element is disposed on the supporting unit. The bump element is located between the first spacer and the lens unit for preventing the first spacer from contacting the lens unit.

12 Claims, 1 Drawing Sheet

CAMERA MODULE

BACKGROUND

1. Field of Invention

The present invention relates to a camera module, more particularly, to a camera module that can be manufactured at a wafer level.

2. Description of Related Art

Miniaturized cameras are widely used in many electronic products, such as mobile phones. Recently, wafer level camera modules (WLCMs) that include a wafer-level lens module embedded therein have been employed to manufacture such miniaturized cameras. Wafer level lens modules are manufactured by arranging and stacking a plurality of transparent wafers, each having polymer lenses formed in an array with a replica method, then cutting the transparent wafers. Accordingly, wafer level camera modules can be manufactured to be small, light, and low in cost, which facilitates mass production.

A WLCM usually employs spacers made of glue to separate the elements embedded in the WLCM. However, if the spacers made of glue spill and cover the selected lens area, the spilled glue might block light, and the image quality is reduced as a result. Therefore, there is a need for a new wafer level camera module that is configured to improve image quality.

SUMMARY

According to one embodiment of the present invention, a camera module is disclosed. The camera module includes a lens module, an image sensor, at least one first spacer, and a bump element. The lens module includes a lens unit and a supporting unit connected to the lens unit. The image sensor is disposed corresponding in position to the lens unit for sensing light from the lens unit. The first spacer is disposed between the supporting unit of the lens module and the image sensor for separating the lens module and the image sensor. The bump element is disposed on the supporting unit, and is located between the first spacer and the lens unit for preventing the first spacer from contacting the lens unit.

According to another embodiment of the present invention, a camera module is disclosed. The camera module includes a lens module, an image sensor, at least one first spacer, and a bump element. The lens module includes a lens unit which has an arc surface and a flat surface, in which the arc surface and the flat surface are disposed in a back-to-back configuration. The lens module also includes a supporting unit connected to the lens unit. The image sensor is disposed corresponding in position to the flat surface of the lens unit for sensing light from the lens unit. The first spacer is disposed between the supporting unit of the lens module and the image sensor for separating the lens module and the image sensor. In addition, the bump element is disposed on the supporting unit and is located between the first spacer and the lens unit for preventing the first spacer from contacting the lens unit.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE EMBODIMENTS

Figure 1:
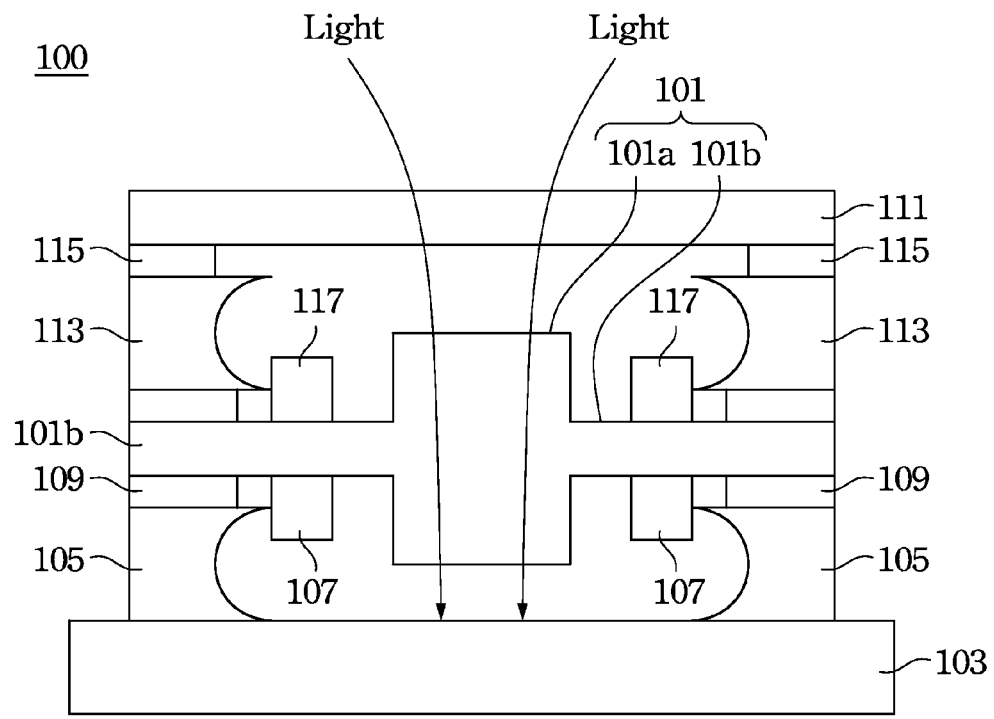
FIG. 1 shows a cross-sectional view of a camera module according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

A camera module of the following embodiment, which is used in mobile phones or notebook computers, employs bump elements to prevent shifting of a spacer and a light curing resin layer. Thus, the spacer or the light curing resin layer can be prevented from touching the lens unit. As a result, image quality can be improved.

FIG. 1 shows a cross-sectional view of a camera module according to one embodiment of the present invention. The camera module 100 includes a lens module 101, an image sensor 103, a first spacer 105, a bump element 107, and a bump element 117. In some cases, the lens module 101 and the image sensor 103 are separately implemented in a lens chip and in a sensor chip.

The lens module 101 includes a lens unit 101a and a supporting unit 101b connected to the lens unit 101a. The lens unit 101a may have a convex lens for concentrating external light or may have a concave lens for curving or diverging external light. The image sensor 103 is disposed corresponding in position to the lens unit 101a for sensing the light passed through the lens unit 101a. With the lens unit 101a, the light can be projected onto the image sensor 103 at a proper angle.

The first spacer 105 is disposed between the supporting unit 101b of the lens module 101 and the image sensor 103 for separating the lens module 101 and the image sensor 103. The first spacer 105 may be made of glass. The first spacer 105 can also be made of elastic material or any other material, as long as the first spacer 105 can separate the lens module 101 from the image sensor 103.

The bump element 107 is disposed on and attached to the supporting unit 101b. The bump element 107 may be made of light curing resin, i.e., ultraviolet (UV) glue. In more detail, the bump element 107 is located between the first spacer 105 and the lens unit 101a for preventing the first spacer 105 from contacting the lens unit 101a. In order to enable the image sensor 103 to sense light over a wide angle, the height of the bump element 107 needs to be less than the height of the first spacer 105. By limiting the height of the bump element 107, the bump element 107 does not block light that should be transmitted to the image sensor 103.

The camera module 100 further includes a light curing resin layer 109 adhered to the supporting unit 101b of the lens module 101 and to the first spacer 105 for attaching the first spacer 105 to the supporting unit 101b. In order to allow proper functioning of the bump element 107, the height of the bump element 107 needs to be greater than the height of the light curing resin layer 109. Thus, the distal end of the bump element 107 exceeds the boundary of the first spacer 105 and prevents the first spacer 105 as well as the light curing resin layer 109 from shifting. As a result, the first spacer 105 and the light curing resin layer 109 will not touch and contaminate the lens unit 101a, and the image quality can thus be improved.

The camera module 100 further includes an aperture module 111, a second spacer 113, and a film layer 115. The aperture module 111 controls and receives the light, that is, the aperture module 111 controls the amount of light entering the camera module 100. The second spacer 113 is disposed between the supporting unit 101b and the aperture module 111 for separating the supporting unit 101b and the aperture module 111. Moreover, the film layer 115 is adhered to the aperture module 111 and bonds the aperture module 111 to the second spacer 113 made of glass.

Figure 2:
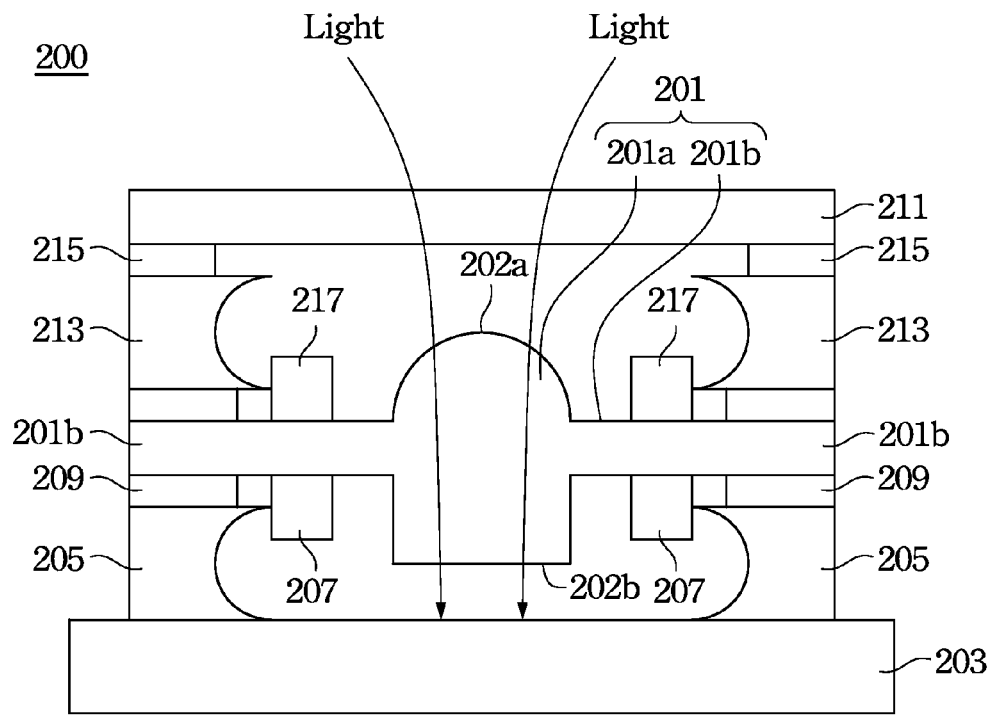
FIG. 2 shows a cross-sectional view of a camera module according to another embodiment of the present invention.

FIG. 2 shows a cross-sectional view of a camera module according to another embodiment of the present invention. The camera module 200 in this embodiment is similar to the camera module 100 shown in FIG. 1, except that the structure of the lens unit 201a is different from the structure of the lens unit 101a.

The camera module 200 includes the lens module 201, the image sensor 203, the first spacer 205, the bump element 207, and the bump element 217. The lens module 201 includes the lens unit 201a and the supporting unit 201b, in which the supporting unit 201b is connected to the lens unit 201a.

The lens unit 201a includes an arc surface 202a and a flat surface 202b, in which the arc surface 202a and the flat surface 202b are disposed in a back-to-back configuration. That is, if the side of the lens unit 201a through which light enters the lens unit 201a is defined as the object side of the lens unit 201a and the side of the lens unit 201a through which light exits the lens unit 201a is defined as the sensor side of the lens unit 201a, the arc surface 202a is formed on the object side of the lens unit 201a and the flat surface 202b is formed on the sensor side of the lens unit 201a. The arc surface 202a, which may be in the form of a convex lens, is used for adjusting the angle of the incoming light before being received by the image sensor 203. The incoming light adjusted by the arc surface 202a is then passed through the flat surface 202b.

The image sensor 203 is disposed corresponding in position to the flat surface 202b of the lens unit 201a for sensing light from the lens unit 201a. The first spacer 205 is disposed between the supporting unit 201b of the lens module 201 and the image sensor 203 for separating the lens module 201 and the image sensor 203. The bump element 207, which may be made of light curing resin (i.e. UV glue), is disposed on the supporting unit 201b in a manner disposed between the first spacer 205 and the lens unit 201a. The bump element 207 prevents the first spacer 205 from contacting the lens unit 201a.

In order to enable the image sensor 203 to sense light over a wide angle, the height of the bump element 207 needs to be less than the height of the first spacer 205. In this way, the bump element 207 does not block light that should be received by the image sensor 203.

The camera module 200 further includes the light curing resin layer 209 adhered to the supporting unit 201b of the lens module 201 and to the first spacer 205 for attaching the first spacer 205 to the supporting unit 201b. In order to allow proper functioning of the bump element 207, the height of the bump element 207 needs to be greater than the height of the light curing resin layer 209. Thus, the distal end of the bump element 207 exceeds the boundary of the first spacer 205 and prevents the first spacer 205 and the light curing resin layer 209 from shifting. As a result, the first spacer 205 and the light curing resin layer 209 do not touch and contaminate the lens unit 201a, and the image quality can be improved.

The camera module 200 further includes the aperture module 211, the second spacer 213, and the film layer 215. The aperture module 211 controls and receives the light, that is, the aperture module 211 controls the amount of light entering the camera module 200. The second spacer 213 is disposed between the supporting unit 201b and the aperture module 211 for separating the supporting unit 201b and the aperture module 211. Moreover, the film layer 215 is adhered to the aperture module 211 and bonds the aperture module 211 to the second spacer 213 made of glass.

With the bump elements of the above embodiments, the spacers and the light curing resin layer can be prevented from shifting, such that the lens unit is not touched or stained by the spacers or the light curing resin layer. As a result, image quality can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A camera module comprising:
   a lens module comprising a lens unit and a supporting unit connected to the lens unit;
   an image sensor disposed corresponding in position to the lens unit for sensing light from the lens unit;
   at least one first spacer disposed between the supporting unit of the lens module and the image sensor for separating the lens module and the image sensor;
   a bump element disposed on the supporting unit and extended toward to or backward to the image sensor, wherein the bump element is located between the first spacer and the lens unit for preventing the first spacer from contacting the lens unit; and
   a light curing resin layer adhered to the supporting unit of the lens module and the first spacer for attaching the first spacer to the supporting unit, wherein the height of the bump element is greater than the height of the light curing resin layer such that a distal end of the bump element exceeds a boundary of the first spacer.

2. The camera module as claimed in claim 1, wherein the height of the bump element is less than the height of the first spacer.

3. The camera module as claimed in claim 1, wherein the first spacer is made of glass.

4. The camera module as claimed in claim 1, wherein the lens module and the bump element are made of light curing resin.

5. The camera module as claimed in claim 1, further comprising:
   an aperture module for controlling and receiving light entering the camera module;
   a second spacer disposed between the supporting unit and the aperture module for separating the supporting unit and the aperture module; and
   a film layer adhered to the aperture module and bonding the aperture module to the second spacer.

6. The camera module as claimed in claim 1, wherein the lens module and the image sensor are implemented in a lens chip and in a sensor chip, respectively.

7. A camera module comprising:
   a lens module comprising:
      a lens unit comprising an arc surface and a flat surface, wherein the arc surface and the flat surface are disposed in a back-to-back configuration; and
      a supporting unit connected to the lens unit;
   an image sensor disposed corresponding in position to the flat surface of the lens unit for sensing light from the lens unit;

at least one first spacer disposed between the supporting unit of the lens module and the image sensor for separating the lens module and the image sensor;

a bump element disposed on the supporting unit and extended toward to or backward to the image sensor, wherein the bump element is located between the first spacer and the lens unit for preventing the first spacer from contacting the lens unit; and a light curing resin layer adhered to the supporting unit of the lens module and the first spacer for attaching the first spacer to the supporting unit, wherein the height of the bump element is greater than the height of the light curing resin layer such that a distal end of the bump element exceeds a boundary of the first spacer.

8. The camera module as claimed in claim 7, wherein the height of the bump element is less than the height of the first spacer.

9. The camera module as claimed in claim 7, wherein the first spacer is made of glass.

10. The camera module as claimed in claim 7, wherein the lens module and the bump element are made of light curing resin.

11. The camera module as claimed in claim 7, further comprising:

an aperture module for controlling and receiving light entering the camera module;

a second spacer disposed between the supporting unit and the aperture module for separating the supporting unit and the aperture module; and a film layer adhered to the aperture module and bonding the aperture module to the second spacer.

12. The camera module as claimed in claim 7, wherein the lens module and the image sensor are implemented in a lens chip and in a sensor chip, respectively.

* * * * *